(No Model.)

D. J. McDOUGALL.
POTATO DIGGER.

No. 509,760. Patented Nov. 28, 1893.

Fig. 1.

WITNESSES:
Chas. Nida.
C. Sedgwick.

INVENTOR
D. J. McDougall
BY
Munn & Co.
ATTORNEYS.

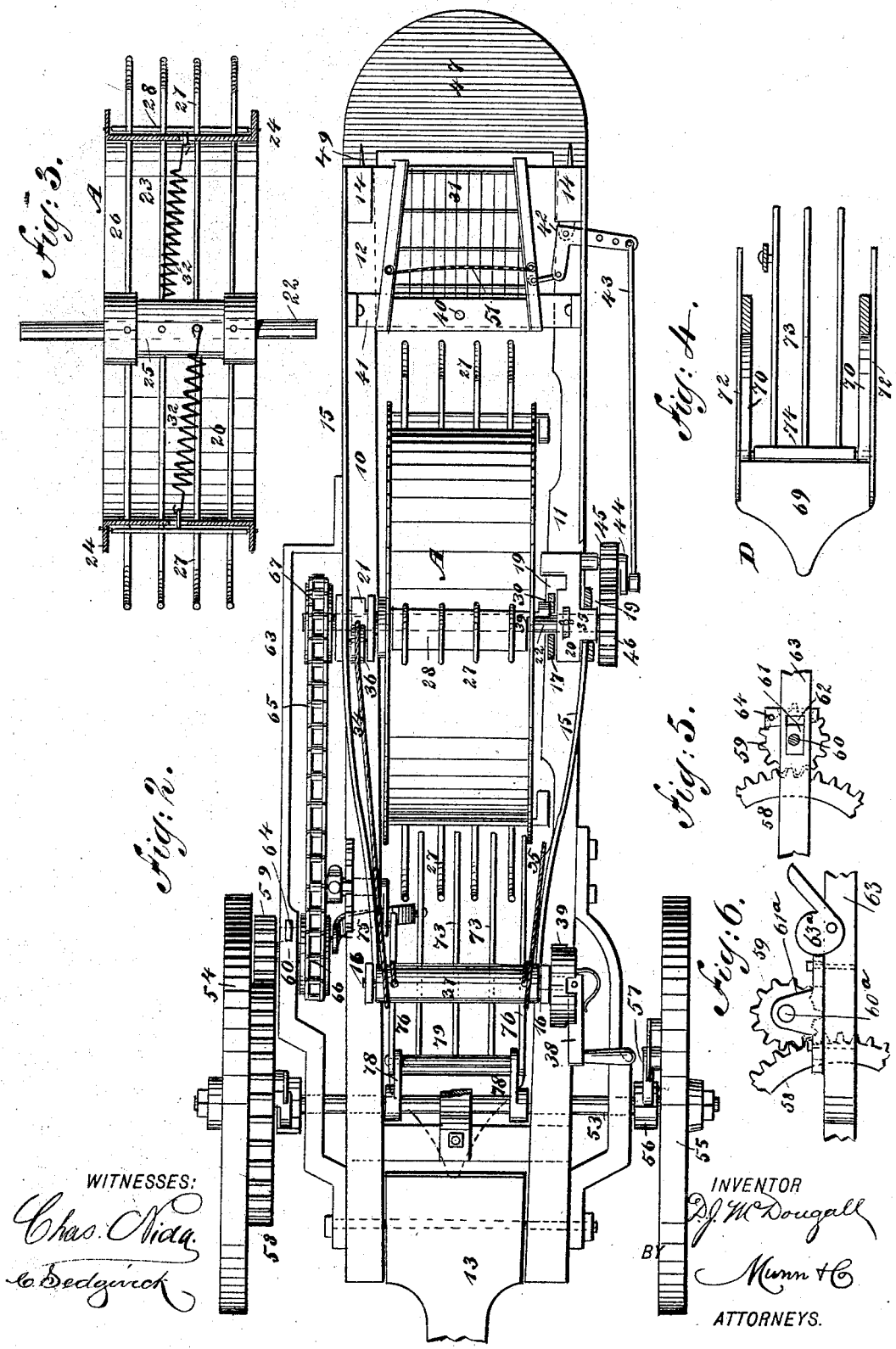

UNITED STATES PATENT OFFICE.

DANIEL JAMES McDOUGALL, OF DEWDNEY, CANADA.

POTATO-DIGGER.

SPECIFICATION forming part of Letters Patent No. 509,760, dated November 28, 1893.

Application filed August 31, 1892. Serial No. 444,615. (No model.)

*To all whom it may concern:*

Be it known that I, DANIEL JAMES MC-DOUGALL, of Dewdney, in the district of Alberta, North West Territory, Dominion of Canada, have invented a new and useful Improvement in Potato-Diggers, of which the following is a full, clear, and exact description.

My invention relates to an improvement in potato diggers, and has for its object to provide a machine of this type in which the potatoes will be gathered by a shovel and the dirt separated therefrom as the potatoes are passed from the shovel, and whereby the separator will deliver the potatoes to a carrying drum, which drum is provided with mechanisms for delivering the potatoes upon a sorting screen or sieve.

Another object of the invention is to provide for the adjustment of the drum, the adjustment of the shovel and the separator attached thereto, and also to provide means whereby the mechanisms to be rotated or reciprocated will be driven from the supporting wheels of the machine.

It is another object of the invention to provide beneath the sorting screen or sieve a box or receptacle to receive the potatoes passing through it, and to provide a platform below one end of the sorting screen or sieve upon which a bag or other receptacle may be placed to receive the potatoes too large to pass through the screen.

The invention consists in the novel construction and combination of the several parts, as will be hereinafter fully set forth and pointed out in the claims.

Reference is to be had to the accompanying drawings, forming a part of this specification, in which similar figures of reference indicate corresponding parts in all the views.

Figure 1 is a sectional side elevation of the machine, a portion at the front and rear being broken away. Fig. 2 is a plan view of the machine, partly in section. Fig. 3 is a detail, sectional view taken through the drum. Fig. 4 is a plan view of the shovel and attached separating fork or fingers. Fig. 5 is a detail view of a shifting mechanism through the medium of which the mechanism to be driven may be thrown out of gear with the driving mechanism; and Fig. 6 is a detail view of a modification of the shifting mechanism shown in Fig. 5.

The frame of the machine comprises preferably two side beams 10 and 11, connected at their rear ends by a platform 12, and between the forward ends of the beams the tongue or pole 13 of the machine is pivoted. From the rear ends of the beams 10 and 11 posts 14, are upwardly projected, and to these posts the rear ends of truss bars 15, are secured, the forward ends of the truss bars being attached to standards 16, projected upward from the side beams some little distance from their forward ends. The truss bars are widest apart at their rear ends, they being made to converge at their center and at their forward ends; and each truss bar at its center supports a segmental guide 17, the guides being in transverse alignment and secured at their upper ends to the truss bars and at their lower ends to the side beams of the frame. These guides are hollow, being provided with an interior chamber extending from the beams 10 and 11 upward to the truss bars; and in opposite sides of each guide vertical slots 18, are produced. Not only are vertical slots produced in the sides of the guides, but in their front and rear edges four longitudinal openings are produced leading into the interior chamber, as shown at 19 in Fig. 2.

In each guide 17 a block is held to slide, the block in one of the slides being designated as 20, and the block in the opposite slide as 21. In these blocks an axle 22, is journaled, and upon this axle a drum A, is rigidly secured. The drum is located at the central portion of the machine and is usually shaped somewhat as a wheel, comprising a tire section 23, provided with marginal flanges 24, a hub 25, and spokes 26 projected from the hub. The spokes 26, are ordinarily of stout wire rods,—and are passed outward through the tire section of the drum. The spokes are arranged in transverse series, and their ends, which extend beyond the tire section of the drum, are curved in direction of the rear of the machine; and as the spokes are rigidly secured to the tire section of the drum their outer curved extensions may be properly denominated fingers, said fingers being designated as 27 in the drawings. In the drawings the fingers are shown arranged in transverse series at predetermined intervals apart, and four series are employed; but I desire it to be distinctly understood that the drum may be provided with any desired number of series of fingers.

In front of each series of fingers a trip plate 28, is located. Each of these plates is provided at its ends with trunnions, and the trunnions are located at the rear edges of the plates and are journaled in the flanges of the drum. One trunnion of each plate is provided with a crank arm 29, as shown in Fig. 1, and as the drum is revolved rearward these crank arms are adapted for engagement with an arm 30, the upper end of which arm is curved, the lower end of the arm being fast to the sliding block 20. When the crank arms 29 of the trip plates engage with the upper end of the arm 30, the forward portions of the trip plates are elevated, being carried in a rearwardly direction, and as the plates lie close to the fingers 27, when the plates are elevated they carry with them the potatoes and throw the potatoes upon or deliver them to the screen or sieve 31, located at the rear portion of the machine. The moment that a crank arm 29, passes the fixed arm 30, the plate carrying the crank arm is immediately restored to its normal position, that is, in engagement with the tire section of the drum through the medium of a spring 32, attached at the under side of the plate and to the hub of the drum, as is best shown in Figs. 1 and 3, each trip plate being provided with such a spring.

The drum is raised or lowered to carry it away from or toward the ground through the medium of ropes or chains 34 and 35, which are passed over friction pulleys 36, located within the chambers of the guides 17, and downward to an attachment with the sliding blocks 20 and 21, the opposite ends of the ropes or chains being secured upon a windlass 37, or equivalent winding mechanism, the windlass being journaled in the forward standards 16, and it is operated through the medium of a handle 38, as shown in Fig. 2, which handle is provided with a rack 39, to recieve it when the windlass is to be held from revolving.

The screen or sieve 31 is given a rearward and downward inclination, and is located over the platform 12. At its forward end the screen is pivoted, as illustrated at 40 in Fig. 2, upon a cross bar 41, or like structure, connecting the truss bars 15. The outer rear end of the screen or sieve extends a slight distance beyond the rear extremity of the frame, and the outer end of the sieve is free to have lateral movement. This movement is imparted to the screen or sieve in any suitable or approved manner, ordinarily, however, through the medium of an elbow lever 42, fulcrumed upon one of the standards 14, one end of the lever being connected by a link or its equivalent, with one side of the sieve near its pivotal end; the other member of the lever has adjustably connected therewith a pitman 43, and the opposite end of the pitman is connected with a crank arm 44, secured upon a short spud axle journaled in an extension of the block 20, the axle being provided with an attached pinion 45, and the pinion is driven by meshing with a gear 46, the latter being fast upon the outer end of the drum shaft 22.

A step 47, is located at the rear of the machine, and this step is adapted to receive a bag 48, as shown in Fig. 1, or a like receptacle, the mouth of which is held open by a bag holder or by attachment to spurs 49, located at the sides of the frame in the back; and a box 50, shown in dotted lines in Fig. 1, or any equivalent thereof, is usually placed upon the platform 12, to receive the potatoes that pass through the meshes of the sieve or screen, the large potatoes being delivered into the receptacle 48.

The sieve or screen is provided with an upright fender 51, extending transversely across its upper edge, which fender prevents the potatoes from rolling from the screen without being properly sorted when they are thrown into the screen through the action of the fingers 27 and the trip plates 28 located back of the fingers.

The rear portion of the machine is supported by a caster wheel 52 and this caster wheel is usually pivoted in the forward central portion of the platform 12, the forward portion of the machine being supported by an axle 53, and this axle is provided with two traction wheels 54 and 55, loosely mounted thereon. The axle near each wheel is provided with a ratchet wheel 56, fast thereon, engaged by dogs 57, the latter being pivotally attached upon the wheel, and are spring-pressed, as shown in Fig. 2. Thus when the machine is drawn forward the dogs will act upon the ratchet wheels 56 in a manner to revolve the axle. One of the wheels 54 has a gear 58 secured upon its inner face, and this gear meshes with a pinion 59, the pinion being mounted upon a shaft 60, which shaft is held to turn in a box 61, held to slide in an opening 62, produced in a side extension 63 of the main frame, the extension 63 comprising a bar which is secured at its extremities to the side beam 10, the bars of the extension being somewhat yoke-shaped. In connection with the sliding box a wedge 64, is provided, and, when the wedge is driven down to an engagement with the rear of the box said box will be forced forward, and the pinion 59, will mesh with the gear 58 upon the traction wheel. When, however, the wedge or key 64, is removed, the box will be slid rearward and the pinion disengaged from connection with the traction wheel and the operation of the working portions of the machine will cease. This rearward movement of the box is accomplished by the weight of the chain belt 65, and this belt is passed over a sprocket wheel 66, fast upon the inner end of the shaft 60, said chain belt passing also over a sprocket wheel 67 fast upon the drum axle 22, as shown best in Fig. 2. The driving mechanism may be varied however, as for example the supporting wheels may be made to turn loosely upon the axle 53, and each wheel be provided upon its inner face with a gear, similar to the gear 58 on the wheel 54, in Fig. 2, and in this event there will be two pinions 59, one at each side of the machine and mounted on one shaft which will be a driving shaft. The shaft 60ª, as shown in Fig. 6, will be mounted in adjustable bearings 61ª, adapted to be moved to or from the gears upon the supporting wheels, to revolve or stop the drive shaft; and this adjustment is preferably accomplished by an eccentric lever 63ª connected with the boxes. This adjustment may also be applied to the box 61 shown in Fig. 5 by mounting that box upon its support.

The potatoes are removed from the ground by means of a digging attachment D. This digging attachment consists of a shovel 69, pointed at its forward end, which shovel occupies an inclined position at the lower end of two spaced shanks 70. The shanks are carried vertically downward from an upper angular frame 71 for some distance, and are then downwardly and forwardly curved, their lower extremities being brought more or less to a point, and the under faces at their lower extremities are beveled. The shovel is secured to the shanks 70 in any approved manner, and at each side of this shovel a guard 72 is located, which guards are in the nature of flanges or fingers, and extend one or more at each side of the body of the shovel some distance rearward of the shanks. Immediately back of the shovel 69 a series of fingers 73, is located. These fingers are attached at their forward ends to a bar 74, the bar being pivoted between the shanks 70, as shown in Fig. 1. The fingers are curved upwardly and rearwardly, and are of such length that the fingers 27 of the drum, when the latter is rotated, will pass between the fingers of the digging apparatus; and preferably the fingers of the digging apparatus are less in number than the number constituting the series of fingers on the drum. The fingers 73 of the digging apparatus receive the potatoes dug by the shovel 69 and the earth following the potatoes, and these fingers are adapted not only to convey the potatoes to the fingers upon the drum but they are also utilized to separate the earth from the potatoes. To that end the fingers 73, are vertically reciprocated, and this is accomplished by connecting one of the outer fingers with the lower end of a connecting bar 75, the upper end of the bar being connected by means of a wrist pin with the gearing on the shaft 60, which gearing is placed upon the shaft close to the beam 11.

The shanks 70, have been heretofore described as connected at their upper ends with a frame 71. This frame is somewhat rectangular in its shape, and as shown in the plan view, Fig. 2, comprises two side arms 76, from the rear portions of which the shanks 70, are downwardly projected; and these shanks, may if desired, constitute integral portions of the bars 76. The bars 76, are united by a truss bar 77, as shown in Fig. 1; and at their forward ends the side bars 76, are pivotally and adjustably connected with hangers 78, two in number, loosely mounted upon the axle 53, the connection between the hangers and the side bars 76, being effected by passing a pin 79 through the hangers and through one of a series of vertically-arranged apertures 80, produced in the forward ends of the side bars 76, which ends are somewhat enlarged vertically, as best shown in Fig. 1. By this means the shovel may be made to travel more or less deeply in the ground; but the shovel may be elevated entirely from the ground by means of a lever 81, provided with the usual thumb latch 82, to engage with a rack 83, located upon the frame of the implement; and this lever is provided with a crank arm 84, said crank arm being journaled in the frame, and one portion of it is connected with the digging apparatus at the junction of its body frame 71 with its shanks 70, or near the said junction. The driver's seat 85, is usually attached to the axle, and is curved upward over the windlass 37.

In the operation of the implement, as it is drawn forward and the shovel is lowered, the shovel digs the potatoes, the potatoes following the shovel rearward and upon the fingers 73 of the shovel, which fingers are constantly vertically reciprocated, as has heretofore been stated. This movement of the fingers 73 tends to separate the dirt from the potatoes; and as the drum A revolves, a series of teeth 27 on the drum pass through the teeth 73 connected with the shovel and receive the cleaned potatoes from the shovel teeth or fingers. The drum teeth or fingers carry the potatoes upward, the potatoes being supported by the fingers and also by the trip plates below the fingers. When a series of fingers has approached practically the upper vertical position, the trip arm 30, will act upon the upper trip plate 28, and will force the said plate upward and rearward, and this movement of the plate, together with the rotation of the drum, will force the potatoes from the drum into the screen or sieve 31, the fender 51, preventing any of the potatoes being scattered when delived to the screen. The screen in the manner that has heretofore been described, is constantly laterally reciprocated and shaken, and the smaller potatoes pass between the meshes of the screen or sieve into a receptacle placed beneath the screen to receive them, while the larger potatoes, that is, those incapable of passing through the meshes of the screen, owing to the movement of the latter and its rearwardly-inclined position, are delivered to the sack or other device carried at the rear of the implement, which sack when filled, may be removed and replaced by another and empty one. It will thus be observed that although this machine accomplishes a great deal, as it digs the potatoes, clears them from the earth, sorts them and delivers them to receptacles, it is not only durable and capable of efficient use in the field, but it is likewise exceedingly simple and economic in its construction.

Having thus described my invention, I claim as new and desired to secure by Letters Patent—

1. The combination with the wheeled frame, of the loosely suspended brackets, extending rearwardly from the axle the angle frame having vertical series of apertures at the forward ends of the horizontal members through which and the bracket pins are passed, a shovel or plow carried by the lower ends of the vertical members of the angle frame, and the adjusting lever having a crank arm pivotally connected with the angle frame at or near its angle, substantially as set forth.

2. In a potato digger, the combination, with a shovel and reciprocating fingers located back of the shovel, of a drum held to rotate back of the shovel fingers, the said drum being provided with a series of peripherally located fingers curved in direction of the shovel fingers and adapted to pass between them, trip plates pivotally attached to the drum beneath the drum fingers, a trip mechanism operating upon the plates, and a sorting sieve or screen located back of the drum and adapted to receive potatoes from the fingers and the trip plates of the drum, as and for the purpose specified.

3. In a potato digger, the combination, with a digging shovel, of a drum located back of the shovel and carrying a series of peripherally arranged curved fingers, spring controlled plates pivotally located beneath the fingers of the drum, a trip mechanism engaging with the plates at a predetermined point in the revolution of the drum, and a sorting screen held to reciprocate back of the drum, as and for the purpose specified.

4. In a potato digger, the combination, with the digging apparatus, a frame provided with a platform near its rear end, and a step at said end, of a drum mounted to revolve in the frame, the frame being vertically adjustable, curved fingers arranged in transverse series upon the periphery of the drum, spring-pressed trip plates located beneath each series of drum fingers, a trip mechanism carried by the frame and engaging with the trip plates at a point in the revolution of the drum, a screen or sieve mounted to reciprocate at the rear end of the machine and having a downward inclination in direction of the step, a driving mechanism rotating the drum, and a reciprocating mechanism connecting the sieve with the driving mechanism, as and for the purpose specified.

5. The combination with the wheeled frame and digging mechanism, of the slotted standards on the frame in rear of the axle, vertically adjustable blocks mounted in said slots, means for raising and lowering the blocks, a rotary drum journaled in said blocks provided with fingers and driven from the axle or drive wheels, a gear wheel mounted on the drum axis and meshing into a gear carried by one of said blocks and provided with a crank arm, a screen into which the drum delivers and connections between the screen and said crank arm.

DANIEL JAMES McDOUGALL.

Witnesses:
E. D. H. WILKINS,
J. SYDNEY COWAN,
*Law Students.*